United States Patent Office 2,778,283
Patented Jan. 22, 1957

2,778,283

PREPARATION OF COATED ASBESTOS-CEMENT PRODUCTS

Phillip S. Bettoli, Belle Mead, George L. Brown, Moorestown, and Clarence R. Eckert, Englewood, N. J., and Benjamin B. Kine, Levittown, Pa.

No Drawing. Application May 28, 1953,
Serial No. 358,192

11 Claims. (Cl. 92—40)

This invention relates to coated hydraulic cement products, especially to asbestos-cement products. More particularly, it relates to the preparation of asbestos-reinforced cementitious products such as shingles and siding materials. Specifically it relates to an improved process for the preparation of coated asbestos-cement shingles and sidings which do not effloresce.

It is well known that many cementitious products tend to become unsightly due to the efflorescence of calcium compounds. Some attempts in the past to prevent such objectionable efflorescence have involved mixing various materials such as inorganic salts, bitumens et cetera with the cementitious mixtures in order either to insolubilize the calcium compounds or to waterproof the compositions so that water cannot enter the compositions and later bring the calcium salts to the surface. Other attempts have been made to coat the cured compositions in order to render them impervious to water and, hence, to reduce their inclination to effloresce. Still others have involved treating cementitious products with carbon dioxide in order to convert calcium salts to insoluble calcium carbonate.

The process of this invention represents an advance in the art because the products of this invention are unusually attractive in appearance and the method by which they are prepared is also attractive from the standpoint of engineering and production.

An object of this invention is to provide a new method for coating asbestos cement compositions which is commercially practical and which is more economical than older coating processes. A further object is to provide a means of preventing blooming or efflorescence of such compositions. Still another object is to coat the surfaces so that the compositions are resistant to the effect of weather and to the penetration of moisture, are less subject to staining by dirt or by water-borne stains, and which have an enhanced, glossy appearance.

These and other objects are accomplished by the process of this invention which comprises, first, coating freshly formed asbestos-cement compositions with films of a particular kind of dispersion described below while the wet, soft, plastic and non-indurated compositions are on the forming machine, then drying the films until they are tack-free and have a moisture-content below about 30%, and finally removing the coated compositions from the forming machine and curing them. The value of the instant process resides in the fact that the compositions are coated while they are still in a non-rigid and plastic condition on the forming machine and that, immediately on removal from the machine, they can, nevertheless, be stacked one on another in piles, which can be several feet high, without danger of sticking or of blocking together during the curing of the composition. Alternatively the soft, plastic coated compositions can be autoclaved under steam pressure if desired, but one of the advantages of this invention is that such a treatment is unnecessary and that the coated compositions need only to be stacked during the period of hydration of the cement.

The dispersion is applied to the asbestos-cement compositions by conventional means, preferably by spraying. While it can be applied either before or after any compressing and/or embossing treatment of the compositions, it is much preferred to do so after the composition has been compressed and has been subjected to a heat-treatment, as for example by passage through an oven or under a bank of radiant heaters. Alternatively compositions which have had no heat treatment can be coated and then heated. What is essential is that the applied coatings of the dispersions dry rapidly to tack-free condition before the coated compositions are stacked for curing.

A descripion of the preferred mode of operation is as follows: The freshly formed wet, plastic asbestos-cement sheet, colored or uncolored, passes from the forming part of the machine on a conveyor through a gas-fired, radiant heat oven. This raises the temperature of the surface of the sheet to approximately 140°–150° F. and reduces the moisture content to about 20%. The sheet, still plastic and non-rigid, is then textured by contact with an embossing roll. Immediately following this, it is sprayed with a dispersion at a solids-content of about 10%–20%, although the solids-content is not critical and is merely adjusted to permit easy application of a film having adequate thickness. A deposit which is equivalent to two grams or more—and preferably from two to three grams—of resinous solids per square foot is applied. The residual heat in the sheet is sufficient to flash dry the dispersion to the point where a clear, tack-free, non-blocking film of resin is deposited. The sheets can then be cut to the desired size and shape. At this stage the coated asbestos-cement compositions are so soft and plastic that they can be deformed by manual pinching, but they are also tack-free. They are next removed from the conveyor and are stacked for curing.

During the curing of the coated compositions a considerable amount of heat is generated due to the hydration of the cement and the temperature within the stacks may reach 185° F. The weight or pressure on the sheets or layers of the compositions in the lower portions of the piles is of necessity very high but the coatings of resin do not become tacky or adherent to other surfaces. Rather, they maintain excellent adhesion to only the surfaces on which they were applied.

After the sheets of asbestos-cement composition have reached a sufficient degree of cure so as to permit handling without danger of breakage, they may be packaged for shipment or passed through trimming dies if certain shapes are desired which have not been made on the forming machine.

It is apparent that the coating materials which are applied must have a most unusual combination of properties. The coatings must be applied in the form of aqueous dispersions and the films which are deposited as the dispersions dry must be clear, substantially colorless, resistant to ultra-violet light, alkalis and to water, adhesive to wet, green, unset asbestos-cement compositions and they must dry very rapidly to a tack-free condition and remain tack-free, even under high pressures and at elevated temperatures.

The aqueous dispersions which are employed contain copolymers of (a) the lower alkyl esters of acrylic and methacrylic acids and (b) acrylic, methacrylic and/or itaconic acids, which copolymers are cross-linked by means of certain polyvalent metals. They are made by emulsifying and copolymerizing—preferably under the influence of a peroxidic or free-radical catalyst—a mixture which contains at least one of each of the two kinds of polymerizable materials mentioned above, and then neutralizing at least some of the free carboxyl groups in the copolymer by means of an oxide, hydroxide, or salt of a polyvalent metal, according to the disclosure of an application for Letters Patent, Serial No. 336,632, filed February 12, 1953, now abandoned and replaced with a continuation-in-part thereof, Serial No. 425,331, filed April 23, 1954, which has issued as U. S. Patent 2,754,280, July 10, 1956.

The resultant products are to all intents and purposes dispersions of cross-linked resins because pairs of carboxyl groups in the various molecular chains are joined together; i. e., are cross-linked, by the atoms of the polyvalent metals. As long as a substantial amount of water is present, ionization occurs and the positive ions of the cross-linker and the negative ions of the resin have a certain degree of mobility so that the cross-linkages are not fixed or rigid. As a result, the resin particles in a film of resin can and do coalesce as drying takes place. However, as the water is removed by evaporation or force-drying, the mobility of the ions is gradually reduced; and when at least 70% of the water is removed, the ions become immobilized. Then the metals and the long chains of resin become chemically bound in a rigid, fixed, tack-free, and cross-linked molecular configuration.

The dispersions used in this invention are in reality those of ionically cross-linked resins and they are decidedly different from and are not to be confused with the dispersions of resins which are cross-linked by means of a polyvinyl compound such as divinylbenzene. The latter kind of dispersions contains resins which are rigidly cross-linked even when they are dispersed in the aqueous phase and consequently on drying they deposit the resin in the form of discrete particles which do not effectively coalesce and which form weak or discontinuous films. Furthermore, the dispersions employed in this invention give rise to films which are not subject to cold-flow and which do not block in contrast to dispersions of the same esters and acids which are not ionically cross-linked.

The dispersions are prepared by emulsifying at a temperature from 0° C. to 100° C.—and preferably from 10° C. to 60° C.—a mixture of (a) one or more monomeric lower alkyl esters of acrylic and/or methacrylic acid, and (b) monomeric acrylic, methacrylic or itaconic acid or mixtures of these acids in water and polymerizing the mixture while it is in the emulsified form. It is recommended that a nonionic emulsifying agent be used, many of which, such as the p-alkylphenoxypolyethoxyethanols, are well known and are commercially available. The monomeric esters of acrylic and methacrylic acids which have proven to be most satisfactory are the alkyl esters in which the alkyl group contains one to four carbon atoms and which embrace the following: Methyl, ethyl, n-propyl, isopropyl, n-butyl, isobutyl, sec.-butyl, and tert.-butyl acrylates and methacrylates. From 0.25% to 6% on a molar basis—or preferably from 0.5% to 3%—of the acid is employed.

Peroxidic free-radical catalysts, particularly catalytic systems of the redox type, are recommended, such as a combination of potassium persulfate and sodium metabisulfite. Other suitable peroxidic agents include the "persalts" such as the alkali metal and ammonium persulfates and perborates, hydrogen peroxide, organic hydroperoxides such as tert.-butyl hydroperoxide and cumene hydroperoxide, and esters such as tert.-butyl perbenzoate. In this way it is possible to prepare dispersions which contain as little as 1% and as much as 60% of the resinous copolymer on a weight basis. It is, however, more practical—hence preferred—to produce dispersions which contain about 30–50% resin-solids and which can be diluted as desired for application to the asbestos-cement compositions.

Next, free carboxyl groups of the dispersed copolymer are neutralized; and this is done by adding a compound of a polyvalent metal which forms salts with the carboxyl groups of the copolymer. Oxides or hydroxides or basic salts of the following polyvalent metals or their salts of weak acids have been employed for this purpose and all produced emulsions which deposited films of outstanding properties: aluminum, barium, calcium, copper, lead, iron, nickel, cobalt, magnesium, strontium, zinc, titanium, and zirconium. Examples of the basic salts of these metals and their salts of weak acids that have been used successfully include basic aluminum acetate and formate; basic zirconium acetate, chloride, and formate; magnesium and lead acetates; basic titanium chloride; and the like. It has been found that the acid groups of the copolymers must be converted to salt groups, to such an extent that at least 0.25% and preferably 0.5% or more, on a molar basis, of all of the copolymerized units in the final copolymer are salt groups.

The metallic compounds which are used to neutralize the carboxyl groups of the copolymers and thus convert them into salt groups are those of divalent and trivalent metals. Actually, only two valences of the trivalent metals are involved in the neutralization so that the compounds of trivalent metals react, as far as this invention is concerned, as if they were compounds of divalent metals. Therefore, what is required is that the copolymer be reacted with and neutralized by at least 0.125 mole—and preferably from 0.25 mole to 3 moles—of the basic metallic compound for every hundred moles of copolymerized ester and acid.

The following examples, in which all parts are by weight, serve to illustrate the preparation of the dispersions which are employed in this invention.

Preparation of dispersed copolymers

A. The following components were placed in a flask equipped with a mechanical stirrer and thermometer:

74.25 parts ethyl acrylate
217 parts water
6.43 parts non-ionic dispersing agent (a 70% aqueous solution of a tert.-octylphenoxypolyethoxyethanol)

The mixture was cooled to 15° C. and there were added 0.09 part of ammonium persulfate and 0.12 part of sodium hydrosulfite. The mixture was agitated; and the exothermic polymerization soon began, as evidenced by a rise in temperature. The addition of 0.75 part of acrylic acid was at once begun and continued over a period of five minutes during which time the temperature rose slightly. The temperature rose rapidly thereafter and reached 60° C. in 10 minutes at which point an ice-bath was applied. The mixture was thereby cooled to 38° C. in 15 minutes at which point the ice-bath was removed and to the mixture was added 0.78 part of tert.-butyl hydroperoxide dissolved in 6 parts of water. The resultant dispersion was further stirred for 30 minutes.

B. A dispersion which, after neutralization with basic aluminum acetate, was very satisfactory for coating asbestos-cement compositions was made in a similar manner by emulsifying and copolymerizing a mixture containing 55% by weight of ethyl acrylate, 39% of methyl methacrylate and 6% methacrylic acid.

C. The dispersions, prepared as above-described, were divided into portions and the individual portions were treated at room temperature with the following basic compounds in such amounts as were equivalent to the amount of copolymerized acid present: $Al(OH)_3$, $Al(OOCCH_3)_2OH$, $Al(OOCCH_3)_2(OOCH)$, $Ba(OH)_2$, $Ca(OH)_2$, $Mg(OOCCH_3)_2$, $Mg(OH)_2$, $Pb(OOCCH_3)_2$, and $ZrO(OOCH)_2$. After two hours the dispersions were filtered.

While all of the resultant dispersions of ionically cross-linked resins dried very rapidly to tack-free films and were satisfactory for the coating of soft, plastic asbestos-cement compositions by the process described above, the most satisfactory for purposes of this invention were those which were cross-linked with aluminum.

The following is a description of the method by which coated, efflorescent-free asbestos-cement shingles were prepared:

A sheet of asbestos-cement composition was prepared on a conventional cylinder-type forming machine. The wet sheet was 5/32 of an inch in thickness and was made up of several laminations and a veneer of approximately .015 inch thickness. The base contained on a solids basis: 80% Portland cement, and 20% asbestos fiber. The veneer contained on a solids-basis: 60% Portland cement, 18% asbestos fibers and 22% mineral oxide pigments and extenders. The composite sheet containing approximately 20% moisture content was run under a bank of radiant heater which reduced the moisture-content to about 18%. The sheet was then textured by means of embossing rolls after which it was sprayed with the dispersion which had been made by process A described immediately above and which had been treated and neutralized with basic aluminum acetate, Al(OCOCH$_3$)$_2$OH, in an amount equivalent to the amount of acrylic acid in said emulsion. The spraying equipment was adjusted to the speed of the machine and a coating of 2–3 grams per square foot of resin-solids was applied. This is to say, the amount of dispersion applied was such as to deposit 2–3 grams of resin, on a dry basis, per square foot of the asbestos-cement sheet. The coated sheets were passed through a short drying section during which time the moisture-content of the resin film was reduced and the film became tack-free. The sheet was then cut into individual sections or units measuring 2 ft. by 4 ft. and these were immediately stacked to a height of two to three feet on wooden pallets. At this stage, the sheets were soft and could be deformed or ruptured by ordinary pinching with thumb and finger. They were not rigid but were so plastic that they conformed to the shape of a surface on which they were placed. The pallets were piled one on another and were stored in a warehouse at ambient temperature for three days. The individual sheets were then removed from the pallets, were punched and trimmed to final dimensions and were packaged. In no instance was there evidence of blocking. That is, the sheets which had been coated and stacked in the plastic condition gave no evidence of adhesion, one to another.

The freedom from blocking was in sharp contrast to the experience encountered when the same cement-asbestos compositions were prepared by the same procedure but were coated with a dispersion containing ethyl acrylate alone.

The shingles prepared as above described and having a coating of ionically cross-linked resin had a sheen and were more attractive in appearance than uncoated shingles. Furthermore, they were extremely resistant to the penetration of moisture. After exposure outdoors for six months, the coated shingles were essentially unchanged in appearance. They showed no efflorescence, no collection of dirt and no fading. They also retained their original semiglassy appearance whereas uncoated control shingles had effloresced and had collected surface dirt and were somewhat lighter in color than the original shade after exposure for the same time under the same conditions.

We claim:

1. A process for preparing coated asbestos-cement compositions which comprises applying to said asbestos-cement compositions while they are in a wet, soft and plastic condition a layer of an aqueous dispersion of a resinous copolymer, drying said layer until it is tack-free and thereafter curing the coated compositions; said dispersion being the product of (1) emulsifying and co-polymerizing a mixture containing 94 to 99.75 molar percent of at least one member of the class consisting of the methyl, ethyl, propyl, and butyl esters of acrylic and methacrylic acids and 6 to 0.25 molar percent respectively of at least one member of the class consisting of acrylic, methacrylic and itaconic acids, and (2) mixing into the resultant copolymer dispersion a basic metallic compound of the class consisting of the oxides, hydroxides and basic salts of polyvalent metals which forms a cross-linked salt of the copolymer by neutralizing carboxyl groups therein which salt forms a non-blocking film on drying of the dispersion, the number of moles of said compound which is mixed thereinto being from 0.125 to 3 percent of the total number of moles of said copolymerized ester and acid.

2. A process as defined in claim 1 in which the compound is basic aluminum acetate.

3. A process as defined in claim 2 in which the copolymer is one of ethyl acrylate and acrylic acid.

4. A process as defined in claim 2 in which the copolymer is a copolymer of 55% by weight of ethyl acrylate, 39% of methyl methacrylate and 6% of methacrylic acid.

5. As an article of manufacture, a formed product comprising an asbestos-cement composition having its surface coated with a water-insoluble copolymer containing, in the polymer molecule, a lower alkyl ester of an acid selected from the group consisting of acrylic, methacrylic, and itaconic acids, and 0.25 to 6 molar percent of carboxyl-containing monomeric units derived from at least one member of the class consisting of acrylic, methacrylic, and itaconic acids, said copolymer being cross-linked by a polyvalent metal.

6. As an article of manufacture, a formed product comprising an asbestos-cement composition having its surface coated with a water-insoluble copolymer containing, in the polymer molecule, a lower alkyl ester of an acid selected from the group consisting of acrylic, methacrylic, and itaconic acids and 0.25 to 6 molar percent of carboxyl-containing monomeric units derived from at least one member of the class consisting of acrylic, methacrylic, and itaconic acids, said copolymer being cross-linked by a polyvalent metal of the class consisting of aluminum, barium, calcium, copper, lead, iron, nickel, cobalt, magnesium, strontium, zinc, titanium, and zirconium.

7. As an article of manufacture, a formed product comprising an asbestos-cement composition having its surface coated with a water-insoluble copolymer of 94 to 99.75 molar percent of at least one member of the class consisting of the alkyl esters of acrylic and methacrylic acids in which the alkyl group of the ester contains one to four carbon atoms and 6 to 0.25 molar percent respectively of carboxyl-containing monomeric units derived from at least one member of the class consisting of acrylic, methacrylic, and itaconic acids, said copolymer being cross-linked by a polyvalent metal.

8. As an article of manufacture, a formed product comprising an asbestos-cement composition having its surface coated with a water-insoluble copolymer of 94 to 99.75 molar percent of at least one member of the class consisting of the alkyl esters of acrylic and methacrylic acids in which the alkyl group of the ester contains one to four carbon atoms and 6 to 0.25 molar percent respectively of carboxyl-containing monomeric units derived from at least one member of the class consisting of acrylic, methacrylic, and itaconic acids, said copolymer being cross-linked by a polyvalent metal of the class consisting of aluminum, barium, calcium, copper, lead, iron, nickel, cobalt, magnesium, strontium, zinc, titanium, and zirconium.

9. A product as defined in claim 8 in which the polyvalent metal is aluminum.

10. A product as defined in claim 9 in which the copolymer is one of ethyl acrylate and acrylic acid.

11. A product as defined in claim 9 in which the copolymer is a copolymer of 55% by weight of ethyl acrylate, 39% of methyl methacrylate and 6% of methacrylic acid.

(References on following page)

References Cited in the file of this patent

UNITED STATES PATENTS

| | | |
|---|---|---|
| 1,967,062 | Novak | July 17, 1934 |
| 2,315,675 | Trommsdorff | Apr. 6, 1943 |
| 2,343,090 | Smith | Feb. 29, 1944 |
| 2,343,095 | Smith | Feb. 29, 1944 |
| 2,422,345 | Easterberg et al. | June 17, 1947 |
| 2,563,289 | Steinman | Aug. 7, 1951 |
| 2,604,668 | Miller et al. | July 29, 1952 |
| 2,617,746 | Parry | Nov. 11, 1952 |
| 2,642,416 | Ahlbrecht et al. | June 16, 1953 |
| 2,646,410 | Kneisley | July 21, 1953 |

FOREIGN PATENTS

| | | |
|---|---|---|
| 580,250 | Great Britain | Sept. 2, 1946 |
| 828,007 | Germany | Jan. 14, 1952 |

OTHER REFERENCES

Fikentscher et al.: APC 397,138, May 11, 1943.